Patented July 1, 1941

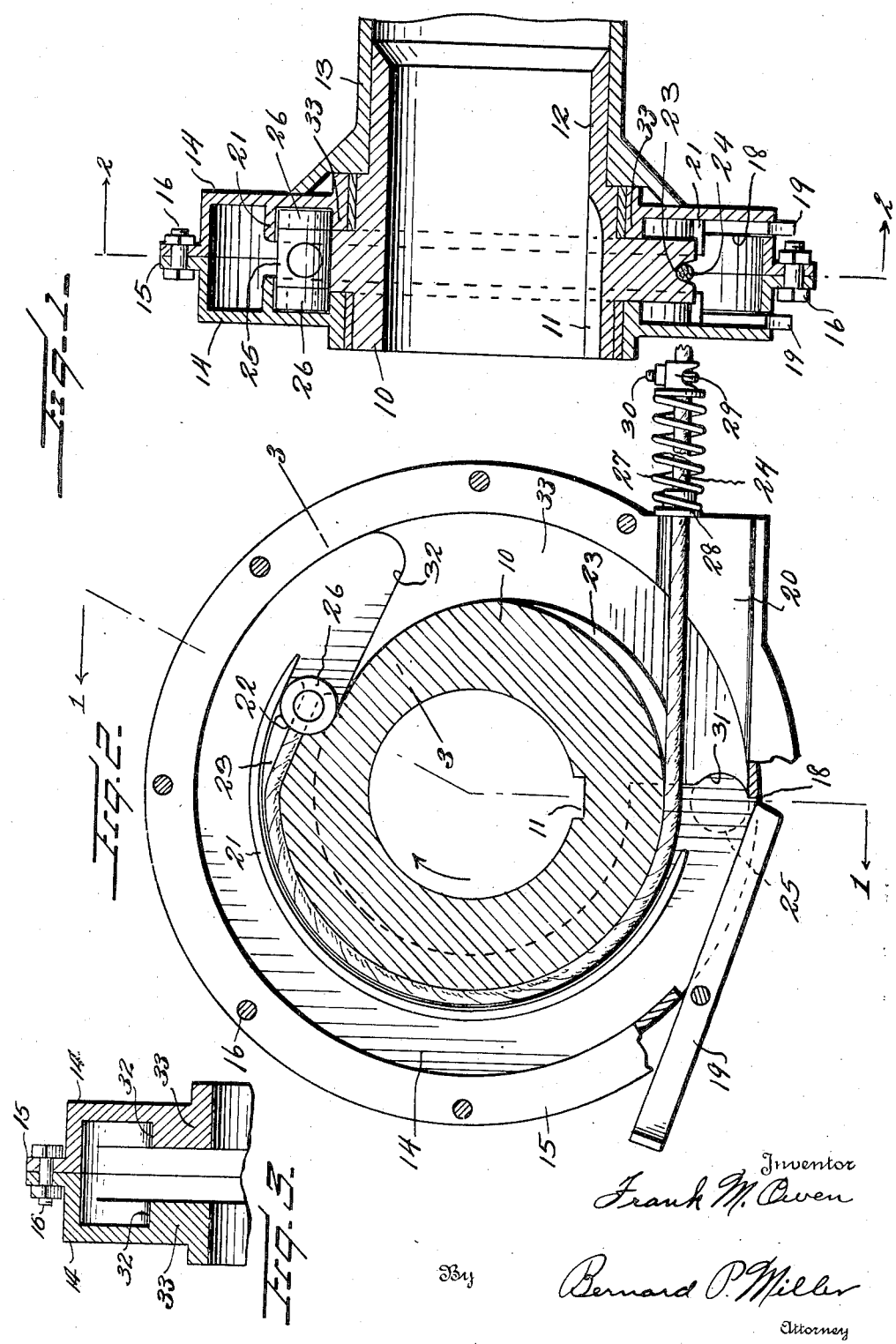

2,247,518

UNITED STATES PATENT OFFICE 2,247,518

RECIPROCATING MEANS FOR CATHEADS

Frank M. Owen, Houston, Tex.

Substituted for abandoned application Serial No. 95,934, August 13, 1936. This application October 13, 1939, Serial No. 299,301

7 Claims. (Cl. 254—173)

This application is a substitution of a former application, Serial No. 95,934, filed by me on August 13, 1936, under the present title, which application was inadvertently abandoned October 6, 1939, by failure to pay the final Patent Office fee after formal allowance.

This invention relates to cat heads of that character in which provision is made for jerking or reciprocating a line, this line being quite commonly engaged with a wrench or tongs used for breaking joints on the drill stem or in the line of pipe.

The general object of this invention is to provide a mechanism of this character, including automatically actuated means carried by a cat head whereby the line attached to the joint breaking tongs may be automatically reciprocated, and a more specific object is to provide a structure of this character embodying an eccentric sheave mounted on a shaft and having an abutment and adapted to engage a runner or like element carried by the line and carry said runner around a portion of the circle described by the rotating sheave and then automatically release said runner to permit the line to be retracted by a spring to its initial position.

A further object is to provide manually operable means for shifting said runner into the path of movement of the abutment on the sleeve.

A still further and important object is to provide a guard extending concentrically to the path of the runner to thereby prevent any accidental detachment of the runner from its engagement with the lug until released position is reached.

Other objects will appear in the course of the following description.

My invention is illustrated in the accompanying drawing wherein:

Figure 1 is a section on the line 1—1 of Figure 2;

Figure 2 is a section on the line 2—2 of Figure 1;

Figure 3 is a section on the line 3—3 of Figure 2.

Referring to the drawing, 10 designates an eccentric sheave which is mounted upon a shaft (not shown) the inner face of the sheave being formed with a keyway 11, whereby it may be keyed upon the shaft and constantly revolved. Mounted upon the lateral extension 12 of the sheave 10 is the cat head 13. The cat head is not completely illustrated inasmuch as cat heads of this character are well known and need no description.

Extending concentrically to the center of rotation of the sheave is a housing 14 which is formed in two sections, the sections being flanged at 15 and held together by the bolts 16. The peripheral wall of this housing is broken away at one point, as at 18, and pivotally mounted upon the housing is a lever 19. Entering the housing is a tangential passage 20, as shown in Figure 2. Extending inward from opposite sides of the housing are the arcuate flanges 21 which together constitute a guard for a purpose to be later stated.

The sheave 10 is eccentric or cam-shaped and is formed at one point on its circumference with a shoulder 22.

Extending around the sheave from this shoulder 22 is a groove 23 defined by lateral flanges or walls.

A cable 24 extends through the passage 20 into the interior of the housing and is adapted to operate in the groove 23. The extremity of the cable is provided with a runner 25 carrying a transversely extending shaft upon which are mounted the rollers 26. The runner 25 is cylindrical in cross-section and the cable 24 passes through the runner and is held to the runner in any suitable manner as by flaring the end of the cable. The depth of the shoulder 22 from its apex to its base is approximately equal to the diameter of the runner 25 and the rollers 26, as shown in Figure 2, and the guards 21 are closely approximated to the periphery of the sheave 10. A spring 27 bears at one end against a washer 28 which in turn bears against the wall of the passage 20 on the exterior of the housing and this spring in turn bears against a head 29 clamped upon the cable 24 by means of the bolt 30.

The material of the side walls is thickened from opening 18 upward in a direction away from the lever 19 to a point nearly opposite the upper extremity of the guard 21. The upper ends of these thickened portions 33 are formed to provide the tangentially extending tracks 32 upon which the rollers 26 are adapted to travel and the lower ends of these thickened portions 33 are slightly recessed to form seats 31 for the rollers 26.

In the use of this device, initially the cable is fully retracted and the rollers of the runner, as shown in dotted lines in Figure 2, bear against seats 31 formed in the lateral walls of the housing 14, the runner under these circumstances being disposed just above the inner end of the lever 19. The other end of this lever is manually depressible and when the outer end of the lever is depressed, it will move the runner 25 inward into the path of movement of the shoulder 22 on the sheave 10. So long as the runner 25 is disposed in the dotted line position in Figure 2, the sheave 10 rotates in the direction of the arrow without touching the runner and, therefore, not affecting the cable 24 but if the outer end of the lever 19 be depressed, the runner is lifted into the path of movement of the shoulder or lug 22, and upon a rotation of the sheave, the runner is carried around from the position shown in dotted lines in Figure 2, the cable being wound upon the sheave in the groove 23 thereof. When the runner has reached the position shown in full lines in Figure 2, then upon a continued movement of the sheave in the direction of the arrow, the rollers 26 will strike the tracks 32 formed in the side walls of the housing 14 and these tracks will shift the runner forward and outward until the runner escapes the shoulder 22. As soon as this occurs, the spring 27 acts to retract the cable and the runner returns around the exterior of the guards 21 or between these guards 21 and the peripheral wall of the housing until the runner has again reached the seat 31. If another reciprocation is desired, then the lever 19 is again depressed, lifting the runner into the path of movement of the shoulder and the same operation re-occurs. By this means, a reciprocation may be given to the cable 24 and this be used to operate a wrench or the like for breaking the joints of a drill stem, pipe line, or for any other purpose for which it is suitable.

It will be seen that the guards are spaced from each other sufficiently to permit the cable to pass between the guards and that the guards prevent any possibility of the cable running off of the sheave as the runner is carried around and prevent any looping of the cable which might tend to disengage it from the sheave. The guards particularly prevent any disengagement of the runner or the rollers therefrom from the shoulder until a full stroke has been made. This makes the mechanism which I have described particularly certain, positive and effective.

It will be noted from Figure 1 that the lateral extensions or bearing extensions of the sheave support the housing 14 which is thus held at all times concentric to the sheave and that by reason of the fact that the housing 14 is supported by these lateral extensions, the guards 21, the tracks 32 and the seat 31 are forced to remain under all circumstances in proper working relation to the sheave. In my construction, the housing constitutes a frame supported by the spool or sheave, that is, by lateral extensions thereof and by the shaft upon which the spool or sheave is mounted. Thus the tracks 32 are always held in precise register with the bottom of the groove 23 and the seat 31 is always held at the same distance from the periphery of the sheave. If the frame or housing were independently mounted relative to the sheave, then if the shaft supporting the sheave were to become slightly bent or the shaft bearings worn, the housing and consequently the tracks, the guard and the seat would shift out of proper relation to the sheave itself.

It will be seen that the mechanism is extremely simple, that it does not in any way interfere with the ordinary use of the cat head and it is thoroughly effective for the purpose intended.

I claim:

1. A structure of the character described, including a sheave adapted to be mounted upon a shaft for rotation therewith and having a radially extending shoulder, the peripheral face of the sheave being circumferentially grooved, the bottom of the groove being in the form of a volute extending from the apex of the shoulder around the sheave to the base of the shoulder, a housing surrounding the sheave and mounted thereon and having a tangential passage at one point, a line extending into said passage and provided with a runner at its inner end, means urging said line outward, the side walls of the housing being formed with a seat for said runner and against which the runner engages when the line is fully retracted by the urging means, a lever pivoted on the housing and having its inner end engageable with the runner to shift it into the path of movement of the shoulder on the sheave whereby the line will be wound upon the sheave, tracks on the side walls of the housing extending outward and in the direction of rotation of the sheave, said tracks engageable with the runner to cause it to move outward out of the path of the shoulder, and guard flanges extending inward from the side walls of the housing and adjacent the flanged periphery of the sheave, said guard flanges extending from said tracks around the sheave nearly to the seat and acting to hold the line in its groove on the sheave and to act as a track for the runner upon the reverse movement of the runner after its release from the shoulder.

2. A structure of the character described, including a sheave adapted to be mounted upon a shaft for rotation therewith and having a radially extending shoulder, the peripheral face of the sheave being in the form of a volute extending from the apex of the shoulder around the sheave to the base of the shoulder, the exterior face of the sheave being grooved, a housing surrounding the sheave and mounted thereon and having a tangential passage at one point, a line extending into said passage and provided with a runner at its inner end, a spring urging said line outward, the side walls of the housing being formed with a seat for said runner and against which the runner engages when the line is fully retracted by the spring, a lever pivoted on the housing and having its inner end engageable with the runner to shift it into the path of movement of the shoulder on the sheave whereby the line will be wound upon the sheave, tracks on the side walls of the housing extending outward and in the direction of rotation of the sheave, said tracks engageable with the runner to cause it to move outward out of the path of the shoulder, guard flanges extending inward from the side walls of the housing and adjacent the periphery of the sheave, said guard flanges extending from said tracks around the sheave nearly to the seat and acting to hold the line in its groove on the sheave the first named tracks carrying the runner to a position outward of the guard flanges whereby these guard flanges act as a track for the runner upon the reverse movement of the runner after its release from the shoulder, the runner comprising a middle portion with which the line is engaged, and rollers upon each side of the central portion engageable with said tracks and with said seat.

3. A cat head structure including a sheave adapted to be mounted on a shaft and having a groove defined by lateral flanges, the periphery of the sheave having at one point a radially extending shoulder, the peripheral face of the sheave being in the form of a volute extending from the base of the shoulder to the apex thereof; a frame having lateral portions rotatably supporting the sheave, said lateral portions holding the frame in unitary relation with the sheave; a guard carried by the frame and extending partly around and concentric to the sheave just outward of the flanges thereof; a line extending tangentially to the sheave; a runner carried by the inner end of the line; means engaging the line and urging it in a direction reverse to the direction of rotation of the sheave; manually controlled means for shifting the runner from a position outward of the path of movement of the shoulder into said path; the frame being constructed and arranged to provide a seat for the runner in advance of the forward end of the guard and outward of the path of movement of the shoulder and to provide tracks extending from a point inward the rear end of the guard tangentially to the periphery of the sheave to a point outward of the guard whereby the runner will be carried radially upon said track outward of the guard and will move over the outside face of said guard upon the return movement of the runner and line.

4. In a cat head structure, a sheave having a peripheral groove and lateral flanges defining the groove, the sheave being adapted to be mounted on a shaft for rotation therewith and having lateral bearing extensions; a frame having lateral members operatively supported on the lateral extensions of the sheave and in which frame the sheave rotates; a line; a shoulder carried by the sheave and acting to engage the end of the line with the sheave to thereby wind the line upon the sheave; means yieldingly resisting movement of the line with the sheave; means for automatically releasing the line from the sheave after a predetermined movement of the sheave; a guard extending partly around the sheave concentric to and closely adjacent to the peripheral flanges of the sheave whereby to hold the line within the sheave groove; and tracks carried by the frame and extending tangentially to a circle concentric to the sheave and from a point coincident with the base of the shoulder when the sheave is in one position and automatically acting to shift the extremity of the line outward away from the sheave to a position outward of the path of movement of the shoulder and outward of the guard.

5. A cat head structure including a sheave adapted to be mounted on a shaft and having a groove defined by lateral walls, the periphery of the sheave having at one point a radially extending shoulder, the peripheral face of the sheave being in the form of a volute extending from the base of the shoulder to the apex thereof, the hub of the sheave having lateral extensions; a housing having lateral walls supported upon the hub extensions of the sheave and disposed concentrically to the sheave, guard flanges extending inward from the side walls of the housing, the guard flanges extending partly around and concentric to the sheave just outward of the groove walls; a line extending tangentially to the sheave and extending out through the housing; a runner carried by the inner end of the line and comprising a middle portion and two outer rollers; means engaging the line and urging it in a direction reverse to the direction of rotation of the sheave; a seat for the runner formed in the side walls of the housing at the forward ends of the guard flanges, said seat being disposed outward of the path of movement of the shoulder; manually operable means for shifting the runner inward into the path of movement of the shoulder; tracks formed in the side walls of the housing and extending from said seat partially around and concentric to the sheave and coincident with the periphery of the sheave at the point of smallest diameter, said tracks having thickened portions from a point inward of the rear ends of the guard flanges, said portions being tangential to the periphery of the sheave and coincident at their inner ends with the path of movement of the base of the shoulder and forming continuations of the passageway from said seat whereby to carry the runner outward away from the path of movement of the shoulder and to a position radially outward of the guard flanges whereby the rollers will engage said guard flanges upon a reverse movement of the line.

6. In a structure of the character described, a sheave adapted to be rotatably mounted on a shaft and having at one point a radially extending shoulder, the peripheral face of the sheave being grooved and the groove being in the form of a volute extending from a point adjacent the base of said shoulder around the sheave to the apex of the shoulder, a line, a runner carried by the extremity of the line and adapted to be engaged by the shoulder, means normally urging the line outward in a direction reverse to the direction of rotation of the sheave, a seat disposed exteriorly of the sheave and carried by said frame and against which the runner normally rests, manually actuatable means for shifting the runner inward into the path of movement of the shoulder on the sheave, a housing within which the sheave rotates and having lateral portions operatively engaging the sheave and holding the housing from radial movement with relation to the sheave, tracks carried by said housing past which the sheave rotates, the inner ends of the tracks being coincident with the base of said shoulder on each side thereof when the sheave is in one position, said tracks extending outward tangentially from the base of the shoulder when the sheave is in said position, and a guard concentric to the sheave acting to hold the runner in contact with the face of the shoulder when the runner is engaged with the shoulder, said guard constituting a track over the outer surface of which the runner moves when the runner is released from its engagement with the shoulder and retracted by the said urging means.

7. A cat head structure, including a sheave having a peripheral groove and lateral flanges defining the groove; the sheave being adapted to be mounted on a shaft for rotation therewith and having lateral bearing extensions; the flanges of the sheave at one point being cut away to provide spaced radially extending shoulders; the outer edges of the flanges being in the form of a volute merging into the peripheral face of the sheave at a point adjacent the base of the shoulders; a frame having lateral members supported on the bearing extensions of the sheave and being thereby held in concentric relation to the sheave; opposed inwardly projecting guard flanges carried by the frame and extending partly around the sheave and concentrically thereto and disposed just outward of the flanges on the sheave; a line extending tangentially to the sheave; a runner carried by the inner end of the line and comprising a middle portion and two laterally disposed rollers; and means engaging the line and urging it in a direction reverse to the direction of rotation of the sheave; the frame being constructed and arranged to provide a seat for the runner in advance of the forward ends of the guard flanges and the frame being constructed and arranged to provide tracks adjacent the rear ends of the guard flanges extending tangentially to the floor of the sheave groove and at their inner ends being level with the floor of the sheave groove; the tracks extending from the sheave to a point outward of the path of movement of the shoulder on the sheave; said tracks being disposed on each side of the path of movement of the sheave whereby the rollers of the runner will engage said tracks and the runner will be carried outward beyond the path of movement of the shoulder and into a position outward of the guard flanges to thus permit the rollers of the runner to engage the outer surface of the guard flanges upon the return movement of the runner and line after the release of the runner from the sheave.

FRANK M. OWEN.